(12) United States Patent  (10) Patent No.: US 8,744,838 B2
Roulland et al.  (45) Date of Patent: Jun. 3, 2014

(54) SYSTEM AND METHOD FOR CONTEXTUALIZING DEVICE OPERATING PROCEDURES

(75) Inventors: Frederic Roulland, Le Versoud (FR); Stefania Castellani, Meylan (FR); Nicolas Hairon, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 288 days.

(21) Appl. No.: 13/362,282

(22) Filed: Jan. 31, 2012

(65) Prior Publication Data

US 2013/0197899 A1  Aug. 1, 2013

(51) Int. Cl.
G06F 17/27  (2006.01)
G06F 11/00  (2006.01)
G06F 3/12  (2006.01)

(52) U.S. Cl.
USPC ................................. 704/9; 714/25; 358/1.14

(58) Field of Classification Search
None
See application file for complete search history.

(56) References Cited

U.S. PATENT DOCUMENTS

| | | | |
|---|---|---|---|
| 5,490,089 A | 2/1996 | Smith et al. | |
| 7,043,549 B2 * | 5/2006 | Breese et al. | 709/224 |
| 7,058,567 B2 | 6/2006 | Aitg-Mokhtar et al. | |
| 7,301,909 B2 * | 11/2007 | Langevin et al. | 370/242 |
| 7,412,502 B2 * | 8/2008 | Fearn et al. | 709/223 |
| 7,441,018 B1 * | 10/2008 | Shafer et al. | 709/220 |
| 7,647,534 B2 | 1/2010 | Castellani et al. | |
| 7,715,037 B2 | 5/2010 | Castellani et al. | |
| 7,774,198 B2 | 8/2010 | Roulland et al. | |
| 7,797,303 B2 | 9/2010 | Roulland et al. | |
| 7,823,062 B2 | 10/2010 | Liberty et al. | |
| 7,949,444 B2 * | 5/2011 | Mukherjee | 701/31.4 |
| 2002/0161875 A1 * | 10/2002 | Raymond | 709/223 |
| 2005/0137843 A1 | 6/2005 | Lux | |
| 2006/0078859 A1 | 4/2006 | Mullin | |
| 2007/0179776 A1 | 8/2007 | Segond et al. | |
| 2008/0126860 A1 | 5/2008 | Sampath et al. | |
| 2008/0294423 A1 | 11/2008 | Castellani et al. | |
| 2009/0106224 A1 | 4/2009 | Roulland et al. | |
| 2009/0292700 A1 | 11/2009 | Castellani et al. | |
| 2010/0149571 A1 | 6/2010 | Thieret et al. | |
| 2010/0229080 A1 | 9/2010 | Roulland et al. | |
| 2011/0175901 A1 | 7/2011 | Meunier et al. | |
| 2011/0270771 A1 | 11/2011 | Coursimault et al. | |
| 2012/0150920 A1 | 6/2012 | Roulland et al. | |
| 2012/0290288 A1 | 11/2012 | Ait-Mokhtar | |

OTHER PUBLICATIONS

U.S. Appl. No. 12/967,210, filed Dec. 14, 2010, Roulland et al.
U.S. Appl. No. 13/103,263, filed May 9, 2011, Ait-Mokhtar et al.

(Continued)

*Primary Examiner* — Jesse Pullias
(74) *Attorney, Agent, or Firm* — Fay Sharpe LLP (57) ABSTRACT

A system and method for contextualizing operating procedures are provided. A set of procedures is provided, each including text describing user actions which are to be performed on a physical device to implement the procedure. A device model refers to components of the device on which user actions are performable and provides state charts which link an action performable on the respective component with states assumed by it. The text of each procedure is segmented to form a sequence of steps. Each step includes an action to be performed on one of the components of the device that is referred to in the device model. When a request for one of the procedures is received, the corresponding sequence of instruction steps is retrieved. A current one of the instruction steps is contextualized, based on device data received from the device and the state chart of the respective component.

20 Claims, 8 Drawing Sheets (56) References Cited

OTHER PUBLICATIONS

Antifakos, et al. "Proactive instructions for furniture assembly", Proc. of the 4$^{th}$ Intl. Conf. on Ubiquitous Computing, 2002, pp. 351-360.
O'Neill, et al. "From ethnographic study to mixed reality: collaborative troubleshooting system", CSCW'11, 2011, ACM, pp. 225-234.
Roulland, et al. "Mixed reality for supporting office devices troubleshooting", Proc. Virtual Reality 2011 Conference, IEEE Computer Society, Mar. 19-23, 2011, pp. 175-178.
Roulland, et al. "Query suggestion for on-device troubleshooting", 12$^{th}$ IFIP TC13 Conf. in Human-Computer Interaction, Aug. 24-28, 2009, pp. 1-4.
Castellani, et al. "Mobile 3D representations for device troubleshooting", World Conf. on Innovative Virtual Reality, Jul. 27-29, 2011, pp. 1-10.

* cited by examiner

SYSTEM AND METHOD FOR CONTEXTUALIZING DEVICE OPERATING PROCEDURES

BACKGROUND

The exemplary embodiment relates to contextualizing information for a device and finds particular application in troubleshooting problems and for maintenance of an electromechanical device, such as a printer.

Operational procedures, such as maintenance and troubleshooting procedures for devices, are usually provided to customers in a technical manual in the form of paper or digital documentation. When a user of the device wishes to identify the cause of a problem with the device or perform maintenance, the documentation is reviewed to find relevant information on the procedures which should be performed on the device. This type of user support suffers several limitations. For example, it may not always be available or accessible at the device. Another problem is that the documentation is often primarily textual, using terminology which is often not in common usage. The documentation may use generic descriptions which allow the procedures to be applicable to a range of devices within a family. An effort of interpretation is thus required in order to apply the procedure to the actual device. Additionally, the instructions are not aware of the current state of the device, for example whether a door is currently open or closed. These difficulties may in many cases prevent or at least slow down the application of the instructions from such manuals.

Documentation is now often in digital rather than paper form, allowing graphical and sometimes animated illustrations of the procedures. However, the procedures are still described for a type of device and are not contextualized to the specific instance of the device to be operated and to its specific configuration and status at the time of the performance of the operation. An effort of translation of the procedure to the specific context of application still remains, irrespective of the quality of the description.

An alternative to the technical manuals often used by product manufacturers is to embed some contextual instructions within the display of the device. These instructions are usually triggered when a particular status of the device is reached and are intended to guide the user in a step-by-step process for solving the issue. For example, when a printer suffers a paper jam, sensors may detect where the paper jam has occurred, triggering the display of jam clearance instructions. However, these contextual instructions are usually limited to few well-known and simple issues and are often provided with little detail, as compared to technical manuals. This is because these instructions tend to be costly to implement and are often limited to normal maintenance operations that are known at the time the device is engineered.

There remains a need for a system and method for assisting device users in performing operations on the device through contextualized device operating instructions.

INCORPORATION BY REFERENCE

The following references, the disclosures of which are incorporated herein by reference in their entireties, are mentioned:

The following references relate generally to troubleshooting systems and methods: U.S. application Ser. No. 12/967,210, filed on Dec. 14, 2010, entitled METHOD AND SYSTEM FOR LINKING TEXTUAL CONCEPTS AND PHYSICAL CONCEPTS, by Frederic Roulland, et al.; U.S. Pub. No. 20050137843, published Jun. 23, 2005, entitled USING GRAPHICS AS A COMPLEMENTARY INTERACTION MODE IN A MDA-LIKE AUTHORING ENVIRONMENT, by Veronika Lux; U.S. Pub. No. 20080294423, published Nov. 27, 2008, entitled INFORMING TROUBLESHOOTING SESSIONS WITH DEVICE DATA, by Stefania Castellani, et al. (now U.S. Pat. No. 7,890,318); U.S. Pub. No. 20090106224, published Apr. 23, 2009, entitled REAL-TIME QUERY SUGGESTION IN A TROUBLE SHOOTING CONTEXT, by Frederic Roulland, et al.; U.S. Pub. No. 20090292700, published Nov. 26, 2009, entitled SYSTEM AND METHOD FOR SEMI-AUTOMATIC CREATION AND MAINTENANCE OF QUERY EXPANSION RULES, by Stefania Castellani; et al.; U.S. Pub. No. 20100149571, Jun. 17, 2010, entitled METHOD AND APPARATUS FOR AUTOMATED CALL ASSISTANCE FOR MALFUNCTIONS IN AN IMAGE PRODUCTION DEVICE, by Tracy E. THIERET, et al.; U.S. Pub. No. 20100229080, published Sep. 9, 2010, entitled COLLABORATIVE LINKING OF SUPPORT KNOWLEDGE BASES WITH VISUALIZATION OF DEVICE, by Frederic Roulland, et al.; U.S. Pub. No. 20110270771, published Nov. 3, 2011, entitled A SYSTEM AND METHOD FOR A FLEXIBLE MANAGEMENT OF THE ESCALATION OF SUPPORT TO DEVICES, by Jean-Marc Coursimault, et al., U.S. Pat. No. 5,490,089 issued Feb. 6, 1996, entitled INTERACTIVE USER SUPPORT SYSTEM AND METHOD USING SENSORS AND MACHINE KNOWLEDGE, by Smith, et al.; U.S. Pat. No. 7,647,534, issued Jan. 12, 2010, entitled METHOD FOR AVOIDING REPETITION OF USER ACTIONS BY USING PAST USERS' EXPERIENCES, by Castellani, et al.; U.S. Pat. No. 7,715,037, issued May 11, 2010, entitled BI-DIRECTIONAL REMOTE VISUALIZATION FOR SUPPORTING COLLABORATIVE MACHINE TROUBLESHOOTING, by Stefania Castellani, et al.; U.S. Pat. No. 7,823,062, issued Oct. 6, 2010, entitled INTERACTIVE ELECTRONIC TECHNICAL MANUAL SYSTEM WITH DATABASE INSERTION AND RETRIEVAL, by Matthew Liberty, et al.; O'Neill, J., et al., "From Ethnographic Study to Mixed Reality: A Remote Collaborative Troubleshooting System," in Proc. Computer Supported Collaborative Work (CSCW'11), Hangzhou, China, pp. 225-234, ACM (2011); Roulland, F., et al., "Query Suggestion for On-Device Troubleshooting," INTERACT 2009, 12th IFIP TC13 Conf. in Human-Computer Interaction, Uppsala, Sweden (2009); Castellani, S., et al. "Mobile 3D representations for device troubleshooting," World Conf. on Innovative Virtual Reality (WINVR), Milan, Italy, (2011).

The following relate generally to natural language processing: U.S. application Ser. No. 13/103,263, filed on May 9, 2011, entitled PARSING OF TEXT USING LINGUISTIC AND NON-LINGUISTIC LIST PROPERTIES, by Salah Aït-Mokhtar; U.S. Pub. No. 20070179776, published Aug. 2, 2007, entitled LINGUISTIC USER INTERFACE, by Frederique Segond, et al.; U.S. Pat. No. 7,058,567, issued Jun. 6, 2006, entitled NATURAL LANGUAGE PARSER, by Aït-Mokhtar, et al.; U.S. Pat. No. 7,774,198, issued Aug. 10, 2010, entitled NAVIGATION SYSTEM FOR TEXT, by Frederic Roulland, et al.; U.S. Pat. No. 7,797,303, issued Sep. 14, 2010, entitled NATURAL LANGUAGE PROCESSING FOR DEVELOPING QUERIES, by Frederic Roulland, et al.; and Roulland, F., et al. "Mixed Reality for Supporting Office Devices Troubleshooting," in Proc. Virtual Reality (VR'11), Singapore, pp. 175-178, IEEE Computer Society (2011).

BRIEF DESCRIPTION

In accordance with one aspect of the exemplary embodiment, a method for contextualizing operating procedures includes receiving a set of procedures, each procedure including text describing user actions which are to be performed on a physical device to implement the procedure. A model of the device is provided. The device model refers to a set of components of the physical device on which user actions are performable and for each of the components in the set, provides a state chart which links an action performable on the component with states assumed by the component before and after the action is performed. For each procedure in the set, the text is segmented into a sequence of instruction steps, each instruction step including an action to be performed on one of the components of the device that is referred to in the device model. A request for one of the procedures is received and the sequence of instruction steps for the requested procedure is retrieved. Device data is received from the physical device. For each of a plurality of the retrieved sequence of instruction steps, a current one of the instruction steps is contextualized, based on the device data and the state chart of the respective component referred to in the device model. A representation of the contextualized instruction step is output to a display device.

In accordance with another aspect of the exemplary embodiment, a system for contextualizing operating procedures is provided. The system includes a model of a device stored in memory. The device model refers to a set of components of a physical device on which user actions are performable. The device model includes, for each of the components in the set, a state chart which links an action performable on the component with first and second states assumed by the component before and after the action is performed. A procedure preprocessor receives a set of procedures. Each procedure includes text describing user actions which are to be performed on the physical device to implement the procedure. For each procedure, the procedure preprocessor segments the text into a sequence of instruction steps, each instruction step including an action to be performed on one of the components of the physical device that is referred to in the device model. A contextual reader receives a request for one of the procedures and receives device data from the physical device. The contextual reader contextualizes a current one of the sequence of instructions for the requested procedure, based on the device data and the state chart of the respective component referred to in the device model. The contextual reader outputs a representation of the contextualized instruction step of procedure to a display device.

In accordance with another aspect of the exemplary embodiment, a method for contextualizing operating procedures includes providing a model of a device which refers to a set of components of a physical device on which user actions are performable and which, for each of the components in the set, provides a state chart which links an action performable on the component with states assumed by the component before and after the action is performed. A set of operating procedures for the physical device is stored, each of the operating procedures having been segmented to form a respective sequence of instruction steps, each instruction step including an action to be performed on one of the components of the device that is referred to in the device model. A request for one of the procedures is received. The stored sequence of instruction steps for the requested procedure is retrieved. Device data is received from the physical device. For each of a plurality of the instruction steps in the sequence of instruction steps, a current one of the instruction steps is contextualized, based on the device data and the state chart of the component referred to in the device model. A representation of the contextualized instruction step is output to a display device associated with the physical device.

DETAILED DESCRIPTION

Aspects of the exemplary embodiment relate to a system and a method for contextualizing operational procedures, such as maintenance and/or repair procedures, for a device. In various aspects, static procedures of a traditional technical document are automatically transformed into procedures that can be flexibly contextualized to a specific device and its current device status.

The exemplary system and method provide for automated generation of contextualized assistance using existing generic maintenance and troubleshooting procedures processed with Natural Language Processing techniques and the support of their execution by a contextual reading module that is aware of the operability constraints of the device and which can monitor its status.

The exemplary method disclosed herein can be decomposed into two stages. In the first stage, technical documentation containing operational procedures for a device or family of devices is translated into sequences of instruction steps using a model of the device to be operated on that are capable of being flexibly contextualized. In a second stage, when a user faces a particular problem with the device or wishes to perform a maintenance operation, contextual procedures are generated and provided to the user.

A "user" can be any person performing actions on the device, such as a customer or a service technician.

Figure 1:
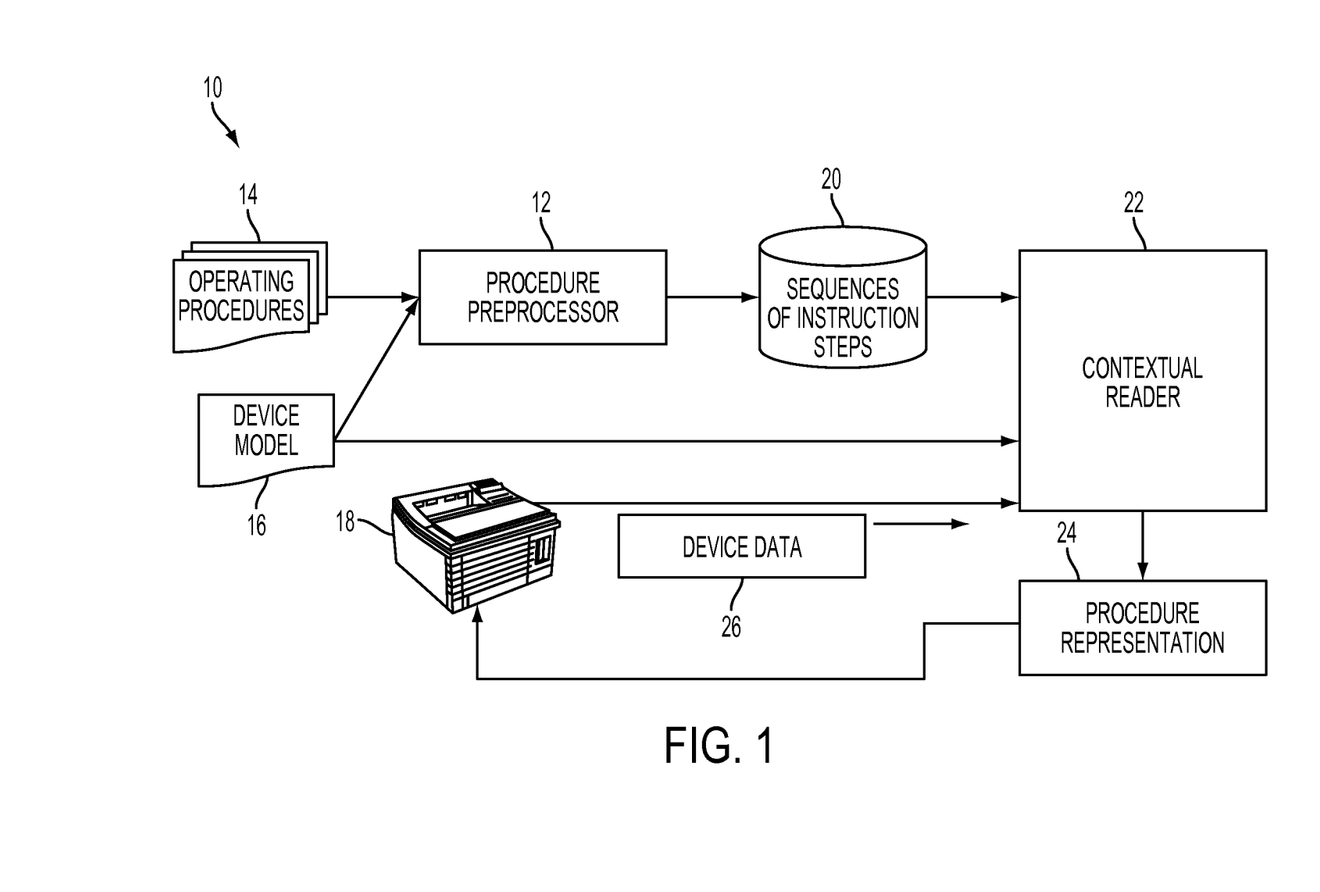
FIG. 1 is a schematic overview of the operation of an exemplary system in accordance with one aspect of the exemplary embodiment.

FIG. 1 provides an overview of the operation of an exemplary system 10 for generating contextual procedures and providing them to a user. Briefly, in the first stage of the method, a procedure preprocessor 12 receives a set of procedures 14 for a physical device or device family, such as a technical manual, and a device model 16, which models the components of a physical device 18. The procedure preprocessor 12 processes each of the procedures 14 in the set to translate it into a tagged sequence of instruction steps 20, using the device model 16.

The procedures 14, as received, may each include a textual description of the actions a user is to perform on the device in order to execute the procedure as well as warnings about actions the user should not perform. The procedure is generally in an unstructured format ("free text"), i.e., each step of a procedure is not separately indexed. The procedures received are also static in that they are independent of the current status of the device. The procedures 14 may be indexed by a description of the procedure.

The device model 16 includes a description of the device components, their properties, operational states, and any operability constraints. The model 16 may include information on the parts of the device that can be accessed and manipulated by a user and be able to represent the information on the current device status that may be relevant to the user during execution of various procedures. In one embodiment, the device model 16 may also include a virtual 2 or 3 dimensional visual representation of the device 18.

In the second stage of the method, when a user accesses a procedure from the finite set of processed procedures, a contextual reader 22 provides a representation 24 of the processed procedure that allows the user to read the procedure in the context of the device 18, and execute it. The representation 24 of the processed procedure includes a representation of each of (or at least appropriate ones of) the sequence of instruction steps 20 that have been previously generated for the procedure. The representation 24 of the instruction steps 20, however, is contextualized with respect to the current execution environment, that is, taking into account both the information contained in the device model 16 and a stream of device status data 26, which may be dynamically output from the device 18 during the execution of the procedure. Each of the sequence of instruction steps 20 forming the processed procedure may be displayed in sequence as the user executes the procedure.

Figure 2:
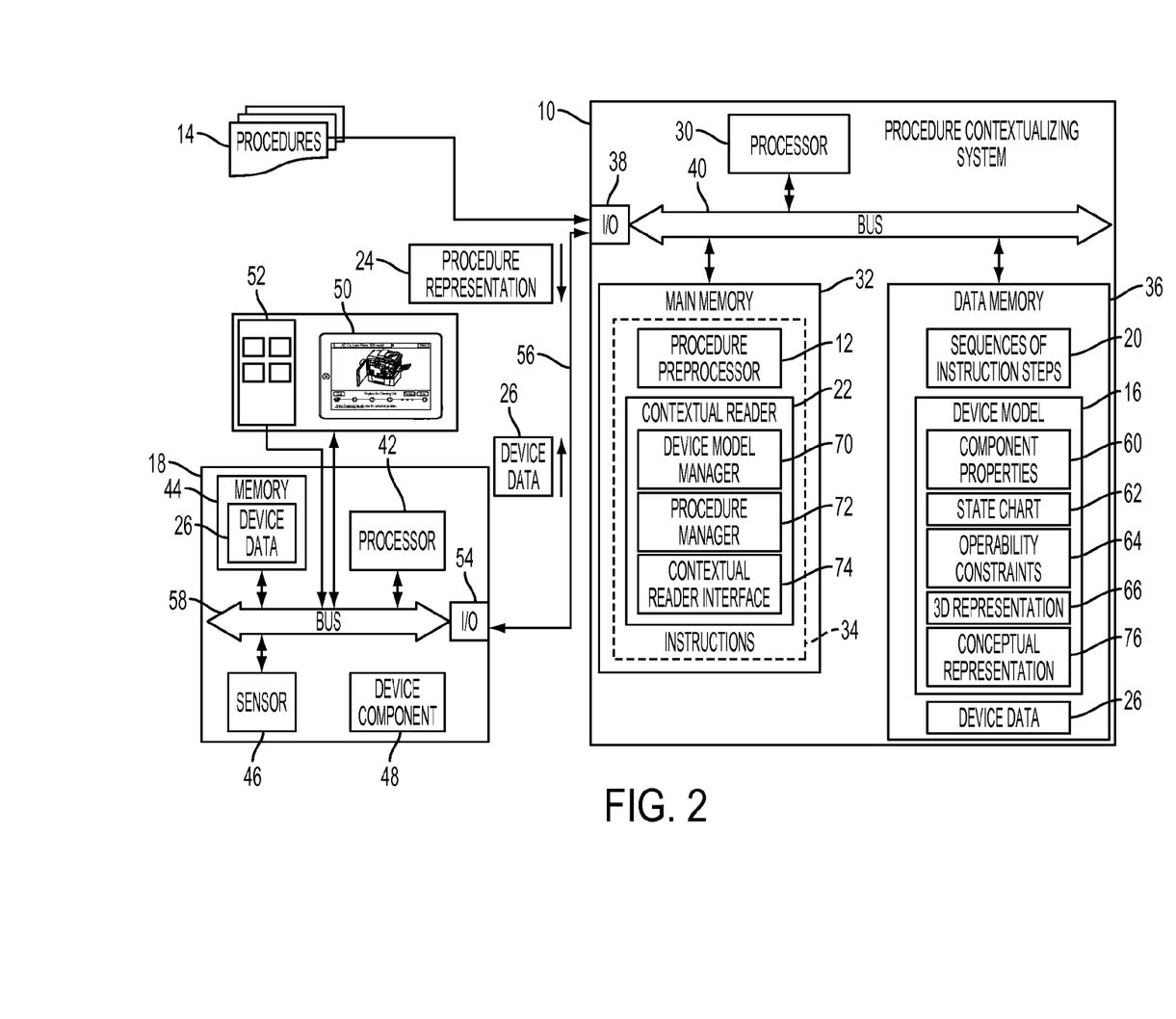
FIG. 2 is a functional block diagram which illustrates one embodiment of an exemplary system for contextualizing device operation procedures in accordance with one aspect of the exemplary embodiment.

With reference to FIG. 2, a functional block diagram of a computer-implemented system 10 for implementing the method is shown. The system 10 is configured for contextualizing device operation procedures. The illustrated system 10 includes a processor 30, which controls the overall operation of the computer system 10 by execution of processing instructions which are stored in memory 32 communicatively connected to the processor 30. Memory 32 also stores instructions 34 for performing the exemplary method, including the procedure preprocessor 12 and contextual reader 22, which are described briefly with reference to FIG. 1. Data memory 36, separate or integral with main memory 32, stores the device model 16, tagged sequences 20 of instruction steps, and device data 26 received from device 18. Data memory may be hosted by the same computing device as memory 32 and processor 30 or may be stored on a remote computing device which is accessible thereto. Computer system 10 also includes one or more interfaces 38 for communication with external devices, such as device 18. Hardware components 30, 32, 36, 38 of the system 10 may be communicatively connected by a data/control bus 40.

In the example embodiment, the device 18 may be a printer or other electromechanical device. As used herein, a "printer" can include any device for rendering an image on print media using a marking material, such as ink or toner. A printer can thus be a copier, laser printer, bookmaking machine, facsimile machine, or a multifunction machine (which includes one or more functions such as scanning, archiving, emailing, and faxing in addition to printing). "Print media" can be a usually flimsy physical sheet of paper, plastic, or other suitable physical print media substrate for images. The operation of applying images to print media, for example, graphics, text, photographs, etc., is generally referred to herein as printing or marking.

The device 18 includes a processor, such as a CPU 42, and memory 44 which stores device data acquired from one or more sensors 46 associated with physical components 48 of the device. The device 18 includes a set of these components 48 on which a user can perform a respective action or set of actions. The components 48 can each assume different states, such as open/closed, in/out, locked/unlocked, and the like. The device status data 26 includes information on the status of the device 18, which includes the current states of these components 48 (to the extent that there is a sensor 46 for the component that is capable of detecting or inferring the current state).

In the case of a printer, for example, the physical components 48 may include doors, drawers, paper handling components, marking components (such as photoreceptors or ink jet heads) marking material supply containers (such as ink or toner cartridges), and the like. The sensors 46 may be real or virtual sensors. See for example, U.S. Pub. No. 20080126860, the disclosure of which is incorporated herein by reference, for examples of sensors.

A display device 50, such as an LCD screen, is integral with or otherwise associated with the physical device 18 and provides a user with visual instructions for operating the device, including displaying the exemplary representation 24 of the procedure. An audible display device 50, such as a loudspeaker, may alternatively or additionally be provided for outputting the representation 24. A user input device 52, such as a key pad, keyboard, touch or writable screen, and/or a cursor control device, such as mouse, trackball, or the like, may be associated with the display device 50 for inputting text and for communicating user input information and command selections to the processor 42. An interface (I/O) 54 allows the device 18 to communicate with external devices via a wired or wireless link 56, such as a cable, telephone line, local area network, or a wide area network, such as the Internet. The various components 42, 44, 46, 48, 50, 52, 54 of the device 18 may all be communicatively connected by a bus 58. The processor 42 may control the operation of the device 18 as well as implementing instructions for rendering the procedure representation 24 on the display device 50. In other embodiments, the associated display device 50 and user input device 52 may be a part of a separate computer device (not shown), such as a mobile computing device, that is communicatively linked, e.g., via a wireless network, to the system 10 and/or device 18.

The computer system 10 may include one or more computing devices, such as a desktop, laptop, tablet, or palmtop computer, portable digital assistant (PDA), server computer, cellular telephone, pager, combination thereof, or other computing device capable of executing instructions for performing the exemplary method. The memory 32, 36 may represent any type of non-transitory computer readable medium such as random access memory (RAM), read only memory (ROM), magnetic disk or tape, optical disk, flash memory, or holographic memory. In one embodiment, the memory 32, 36 comprises a combination of random access memory and read only memory. In some embodiments, the processor 30 and memory 32, 36 may be combined in a single chip. The network interface 38 allows the computer 10 to communicate with other devices via the computer network 56. The digital processor 30 can be variously embodied, such as by a single-core processor, a dual-core processor (or more generally by a multiple-core processor), a digital processor and cooperating math coprocessor, a digital controller, or the like. The digital processor 30, in addition to controlling the operation of the computer system 10, executes instructions stored in memory 32 for performing the method outlined in FIG. 3 and/or FIG. 4, described below.

The various hardware components of the electromechanical device 18, such as the memory 44 and processor 42, may be similarly configured to those of the system 10, except as noted. In some embodiments, the system 10 may be hosted by the device 18, rather than being separate, as shown.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 10 and electromechanical device 18. Since the configuration and operation of programmable computers are well known, they will not be described further.

Figure 3:
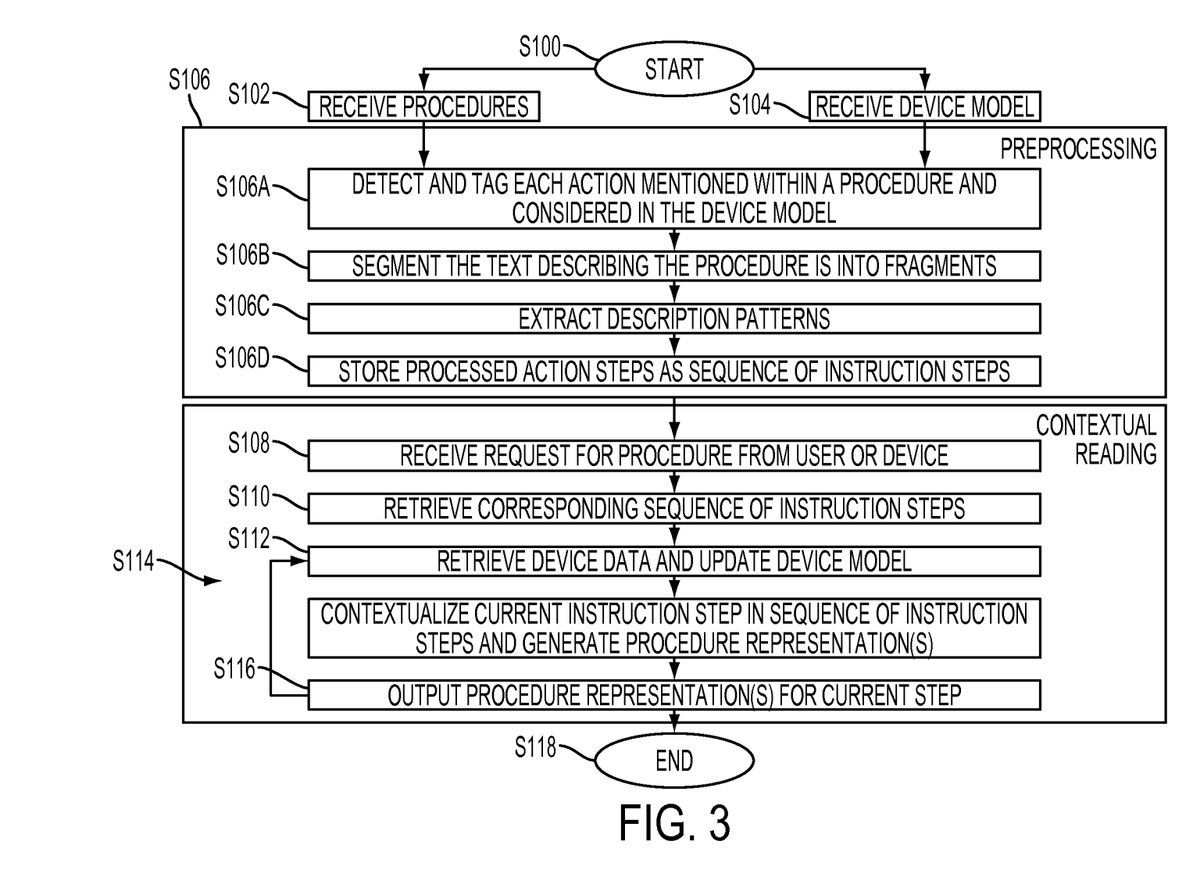
FIG. 3 is a flow chart illustrating a method for contextualizing device operation procedures in accordance with another aspect of the exemplary embodiment.
Figure 4:
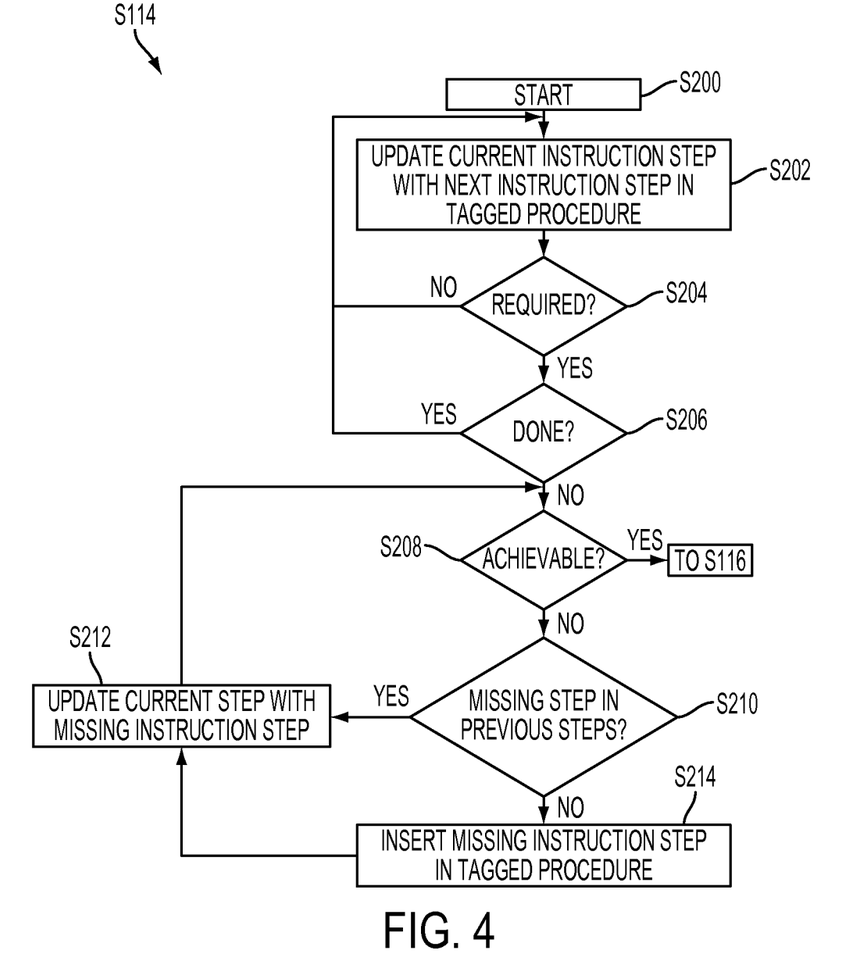
FIG. 4 illustrates generation of a contextualized instruction step in the method of FIG. 3.

FIGS. 3 and 4 illustrate the exemplary method. With reference to FIG. 3, the method starts at S100. At S102, a set of procedures 14 is received, and stored in computer memory 36. A device model 16 is also received at S104, and stored in memory 36.

At S106, the procedures 14 are processed in view of the device model 16 to generate a set of sequences 20 of instruction steps (i.e., processed procedures), which are stored in memory 36. This completes the first stage of the method. As will be appreciated, the preprocessing stage can be performed at any time before or after the physical device 18 is installed at the customer's location and can be performed by the manufacturer, customer, or a third party. Additionally, the preprocessing stage can be repeated, for example if there is an updated set of operating procedures. Each customer device 18 can have its own dedicated set of sequences 20 or a set of sequences 20 can be generated for each device model 16, which is then shared by a set of devices.

In the second, contextual reading stage, at runtime, one or more of the tagged sequences of instruction steps 20 is/are used to generate a contextualized procedure representation 24 for the device 18, to assist a user in performing an operation, which includes a sequence of actions on the device. At S108, for example, a request is received by the system for a procedure for a specific device 18. The request may be submitted by the device or by a user who wishes to perform an operation on the device. The user may select the procedure from a menu displayed on the display device 50, by entering a query, or a combination thereof.

For example, at S110, the system 10 retrieves the sequence 20 of instruction steps from memory corresponding to the requested procedure.

At S112, current device data 26 is received from the device 18 by the system 10, and stored in system memory while it is used to update the device model. The system may request the current device data 26 from the device 18, or the device data may begin to flow automatically from the device when a procedure request is submitted to the system.

At S114, a current one of the sequence 20 of instruction steps is contextualized in view of the device model and the current device data and a representation 24 of the current instruction step, in human readable form, is generated based on the contextualized instruction step. Further details of this step are illustrated in FIG. 4, which is described below.

At S116 the procedure representation 24 for the current instruction step is output to the display 50. The method may return to S112 to await new device data indicative that the step has been performed, until all instruction steps in the sequence have been displayed.

The method ends at S118.

As will be appreciated, the steps of the method need not all proceed in the order illustrated and fewer, more, or different steps may be performed. In one embodiment, the preprocessing steps may be performed by a separate computing device and the processed procedure imported into memory of the system 10.

The following sections describe aspects of the system and method in greater detail.

Device Model

For a given device 18, a model 16 is available that, for each component 48 of the device 18 (or at least those components to which a user has access), provides some or all of the following information:

1. A list of properties 60 that describe either the configuration or the state of the given component 48,
2. A state chart 62 of all the actions that can be physically performed on the given component 48 and their associated beginning and/or ending states,
3. A list of operability constraints 64 that specify the state requirements for other components of the device in order to be able to perform an action on the given component.

This information may be stored in memory 36, as illustrated in FIG. 2. Each component has a unique identifier by which the properties, state chart, and operability constraints are indexed, such as the component's full name or an alphanumeric code. The device model 16 also includes a visual representation 66 of the device in which the components are visualized.

Properties

The properties 60 of a component may describe:

1. Static characteristics of the component 48, such as a capacity for a container, or the type of model, and
2. Dynamic characteristics of the component that evolve according to the operations performed on this component such as, for example, the content level for a container, such as the amount of toner remaining in a toner cartridge or the amount of paper in a paper bin.

State Charts

Each physically actionable component 48 of the device has an associated state chart 62. This can be in the form of a finite state machine where transitions represent actions and each state represents a different status for the component. Each state chart 62 in the device model 16 also indicates the current state of the respective device component 48, to the extent that this information has been provided to the system 10 by the device in the form of device data 26.

Figure 5:
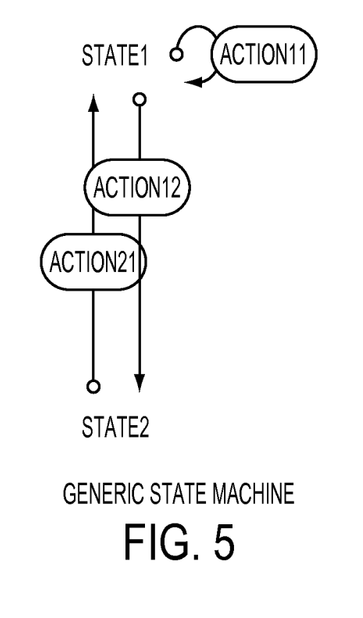
FIGS. 5-7 graphically illustrate state machines for exemplary device components.
Figure 6:
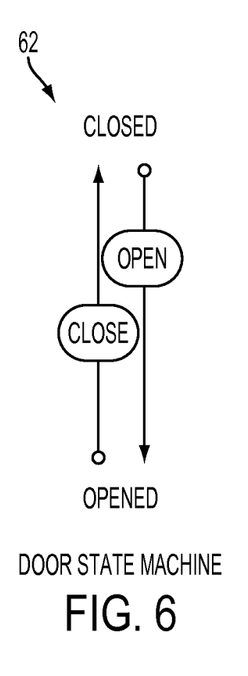
Figure 7:
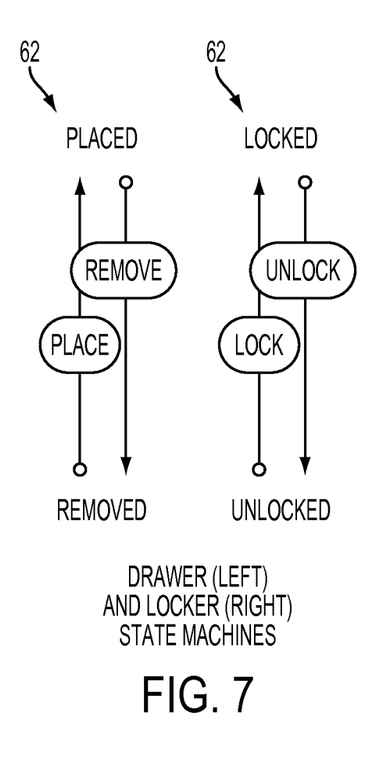

FIGS. 5-7 show examples of state charts for some physical components. FIG. 5 shows a state chart for a generic machine which has two states, state 1 and state 2. Action 1.2 changes the state from state 1 to state 2, and action 2.1 does the reverse. An action 1.1 (corresponding to the action 2.1), if performed when the component is in state 1, has no effect. The door state chart illustrated in FIG. 6 gives a specific case where action 1.2 is opening the door and action 2.1 is closing the door. A sensor 46 associated with the door component on the device may be configured for detecting at least one of these states (from which the other state can be inferred, if needed). For example, an optical, electrical, or mechanical sensor 46 detects when the door 48 is closed. FIG. 7 illustrates state charts for two interrelated components, a drawer and a locking mechanism for the drawer. The drawer can be placed or removed and the locking mechanism can be locked or unlocked. The components are interrelated because one or more states of one component is/are dependent on one or more states of the other component. However, the exemplary state chart 62 for a component 48 only considers actions and states of that component and does not deal with its interactions with the other components of the device 18 (which are described by operability constraints 64).

Operability Constraints

An operability constraint 64 operates to prevent an action being performed on a component 48 unless another component of the device 18 is in a given state (the other component is assumed to be able to assume a plurality of states). For example, using the state chart illustrated in FIG. 7, a drawer is an exemplary component 48 that can be placed and removed and that is constrained by another component, a locking mechanism. The locking mechanism has two states: it can be locked and unlocked. The following operability constraints 64 can be defined for these two components:

1. The action "remove" cannot be performed on the drawer as long as the locking mechanism is in the "locked" status.
2. The action "lock" cannot be performed on the locking mechanism as long as the drawer is in the "removed" status.

Visual Representation of the Device

In some embodiments, the displayed instruction steps are coupled with a representation of the device. The visual representation 66 of the device 18 may include a 2D or 3D representation. The visual representation may include at least the physical components of the device that will be visible or actionable by a user in the context of performing the operating procedures on the device. In the case of a printer, for example, such a representation 66 may include components such as paper storage trays, access doors, moveable levers and baffles for accessing jammed sheets in the paper path, marking media replaceable containers, such as toner cartridges or ink containers, and waste toner receptacles, other replaceable items, such as cleaning units, photoreceptor belts, and fuser roll heaters, finisher components, such as collection trays, stapling devices, and the like. As well as visualizing these components, the 3D representation may 66 visualize appropriate user actions, such as opening doors, turning levels, lifting baffles and so forth which may be used to access and/or repair a component, e.g., in the form of an animation. The 3D visual representation 66 can be based, for example, on COLLADA™ open source software. This software application is a 3D graphics description format based on XML. The computed 3D model can be rendered by a viewer, such as one based on Adobe™ Flash technology, which offers 3D capabilities and which may be extended with additional 3D libraries, such as PAPERVISION 3D™.

In one embodiment, the device model viewer can be called upon to provide a graphic representation of a component of the device that the user is to perform an action upon. The representation can be created through combining geometric shapes, such as polygons, circles, etc. from which the representation 66 is built, as well as textures for recreating surfaces. The exemplary 3D representation 66 uses a collection of points in a 3D scene, which are connected by various geometric shapes, such as triangles, lines, curved surfaces, and the like. With other virtual objects such as texture, camera viewpoint, and optionally the lighting involved in a 3D scene, the model 16 can provide a view in three dimensions (left-right, up-down and forward-backward), and allow manipulation of the 3D representation 66 to give the user a realistic visual experience. The 3D representation 66 generally has several levels of view so that in a troubleshooting context, for example, it is navigable using different levels of detail. The inner parts of the model are not visible initially, but can be displayed as appropriate for navigation of the device. For example, a door will hide interior parts that will be revealed only when the door is opened and the particular area of the model is zoomed.

Components in the representation 66 are referenced by their identifier, which as noted above can be the unique name for that component in the representation.

Procedure Preprocessing (S106)

The procedure preprocessor 12 serves to convert each procedure 14 into a sequence of instruction steps 20, where each instruction step is associated with an action to be performed on a component of the device. The conversion step S106 may be based on natural language processing techniques, which may be involved at different levels, as follows:

Referring once more to FIG. 3, at S106A, each action mentioned within a procedure 14 and considered in the device model 16 is detected and tagged. In some embodiments, this step may be performed at least partly manually.

In some embodiments, this step may be performed automatically or semi-automatically by the system using, for example, the method described in U.S. application Ser. No. 12/967,210, entitled METHOD AND SYSTEM FOR LINKING TEXTUAL CONCEPTS AND PHYSICAL CONCEPTS, by Frederic Roulland, et al. (hereinafter, Roulland 2010), the disclosure of which is incorporated herein by reference. In the exemplary embodiment, the system 10 seeks to identify in the text, each action verb that has as its object, a reference to one of the components in the model 16. The system may, as a first step, label all the action verbs (e.g., using a finite list of action verbs) and the nouns in the text. Then, the system labels nouns that are the object of one of the action verbs. Finally, the system checks the labeled nouns against the components listed in the model 16. Disambiguation techniques may be used to resolve a reference to more than one component.

For example, the action "open the door of the paper drawer" may be tagged with the identifier uniquely corresponding to this particular door in the device model. The preprocessor 12 of the system 10 may use surrounding text to disambiguate a reference to a component. For example, one procedure 14 may state: "Open the door of the paper drawer. Remove the drawer. Refill the drawer. Close the door." The procedure preprocessor can infer from the text that "the drawer" is a reference to the paper drawer mentioned earlier in the procedure and thus tag "the drawer" with the unique ID for the paper drawer in the model 16. The preprocessor also can tag "the door" with the unique ID for the door to the paper drawer. Once the text of the operating procedures has been linguistically processed in this way, the references to components in the device model in the text are tagged. In this way, these references to components in the procedures 14 can be linked to the corresponding state charts and other information on the components in the device model and optionally also to the appropriate parts of the 3D graphical representation 66.

At S106B, the text describing the procedure 14 is segmented into text fragments, where each text fragment includes only a single action on a tagged reference to a component of the device. Each fragment is a text string, such as one or more paragraphs, sentences, or just a part of a sentence, where the sentence includes more than one action on a referenced component. Each text fragment represents only one action of the procedure and may include instructions on how to perform the action, optionally together with additional information such as illustrations, notes, warnings, or remarks related to the instruction step.

The segmentation of the procedure into text fragments may employ a set of heuristics based on syntactic and layout information that can be retrieved from the content and the meta-data associated with the procedure documents. For example, if one and only one action is present in a sentence or a full paragraph, this sentence or this paragraph will be part of the segment of the text associated with this step of the procedure. The object is to generate a set of text fragments, each of which relates to a respective action on a component, so that all or most of the text in the procedure is assigned to a respective one of the text fragments.

The method in S106B is sufficient for those procedures which form a linear sequence of instruction steps: "Do Action 1. Do Action 2 . . . " For more complex procedures, description patterns are extracted from the procedures 14 and formalized in condition language (S106C). For example, the procedures 14 may contain description patterns including some or all of the following:

conditional steps: e.g., "if the component is of type1 then do action1 otherwise do action2";

iterations: e.g. "for each of the trays do . . . "; and loops: e.g., "repeat from step 3".

Each of these description patterns can be detected and considered for the segmentation as follows:

1. The exemplary procedure preprocessor 12 applies a set of natural language linguistic techniques (e.g., parsers rules) that enable it to recognize conditional statements, such as "if . . . then . . . , else . . . " statements. In particular, each condition can be extracted as one or more property/value pairs and the instruction step or steps belonging to the "then" statement can be associated positively to this condition whereas the instruction step or steps belonging to the "else" statement can be associated negatively to the condition. In this way, each instruction extracted from the procedure will be optionally associated to a set of property/value pairs together with a flag that indicates if this condition needs to be true or false.

2. For iterations, if they are expressed in the form of lists of instructions, then these lists can be parsed using a method such as the one described in U.S. application Ser. No. 13/103, 263, entitled PARSING OF TEXT USING LINGUISTIC AND NON-LINGUISTIC LIST PROPERTIES (Aït-Mokhtar, 2010), the disclosure of which is incorporated by reference. This reference discloses how lists in text can be automatically recognized and processed such that a list introducer is linked to a set of list items so that dependency relations between them can be extracted. In this way, a set of instruction steps forming a sequence to be repeated until a condition arises can be identified.

Otherwise if the description patterns are represented by a generic term such as "For each tray . . . " the device model 16 can be relied upon to provide static component properties such as a class or category where the value can be matched with this generic term. Once the list of considered components has been identified, the procedure preprocessor 12 of the system can create a sequence of instruction steps where all the instruction steps mentioned in the "for" paragraph will be repeated for each of the components listed. For example, the procedure "for component1 and component2 do action1 and do action2" may be stored as the following enumerated sequence of instruction steps:

Action1, component1
Action 2, component1
Action1, component2
Action2, component2

3. When a loop instruction is detected, if the loop is associated to a fixed number of times, then the set of instruction steps related to this loop may be stored as many times as mentioned in the loop. If the loop is associated to a condition, then the condition is associated to the last instruction of the loop in the same way as for the "if" statements, together with a reference to the first instructions of the loop. In this way, the contextual reader 20 will be able to return to the first instruction step of the loop if the condition is not fulfilled at the reading time.

Moreover, when a reference to an action is found in the procedure that is to be expressed in a negative sense, e.g., "Please do not touch the <component A>", the preprocessor 12 will not consider it as a normal step of the procedure. This type of sentence is typically meant to warn the user or to forbid the user to perform an action for security reasons or because it may prevent a successful completion of the procedure. In this case, the system may either ignore the instruction or record it with a specific flag so that it can be displayed appropriately at reading time.

At S106D, all the action steps 20 extracted from the procedures and associated metadata during the preprocessing stage are stored so that they can be interpreted during the contextual reading phase, described below.

For processing the text of the procedures, the procedure preprocessor 12 may include or have access to a linguistic parser which performs natural language processing (NLP) on the text of the operating procedures. The parser generally takes as input text, such as one or more operating procedures, in electronic form, each piece of text including at least one text string, and transforms the input text into annotated text. As used herein, the term "parser," generally refers to all of the annotation processing instructions which may be utilized in the annotation of the text string. In general, the parser includes instructions for syntactically, semantically, and lexically analyzing the text content of the text and identifying syntactic relationships (more generally, dependencies) between lexical units (words or groups of words) in the text. The exemplary parser applies a set of rules for assigning labels to fragments of the text. Specifically, for this application, the parser breaks down each of the text strings into a sequence of tokens, and applies finite state transducers to associate each word or token with lexical information, such as morpho-syntactic information, semantic information, and associated parts of speech. Based on these labels, the parser extracts dependencies in a given text string.

The parser may be an incremental parser capable of performing robust and deep syntactic analysis. An exemplary parser is the Xerox Incremental Parser (XIP), as described, for example, in U.S. Pat. No. 7,058,567 to Aït-Mokhtar, incorporated herein by reference in its entirety, and in Aït-Mokhtar S., Chanod, J. P., Roux, C. "Robustness beyond Shallowness: Incremental Dependency Parsing," Special issue of NLE journal (2002) (hereinafter "Aït-Mokhtar 2002"); Aït-Mokhtar, et al. "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997. The linguistic processing can be adapted to the requirements of the present application—not all the rules in a conventional parser may be needed. Additionally, additional rules may be applied on top of the regular parser rules to implement aspects of the preprocessing disclosed herein.

Contextual Reading (S108-S116)

Figure 8:
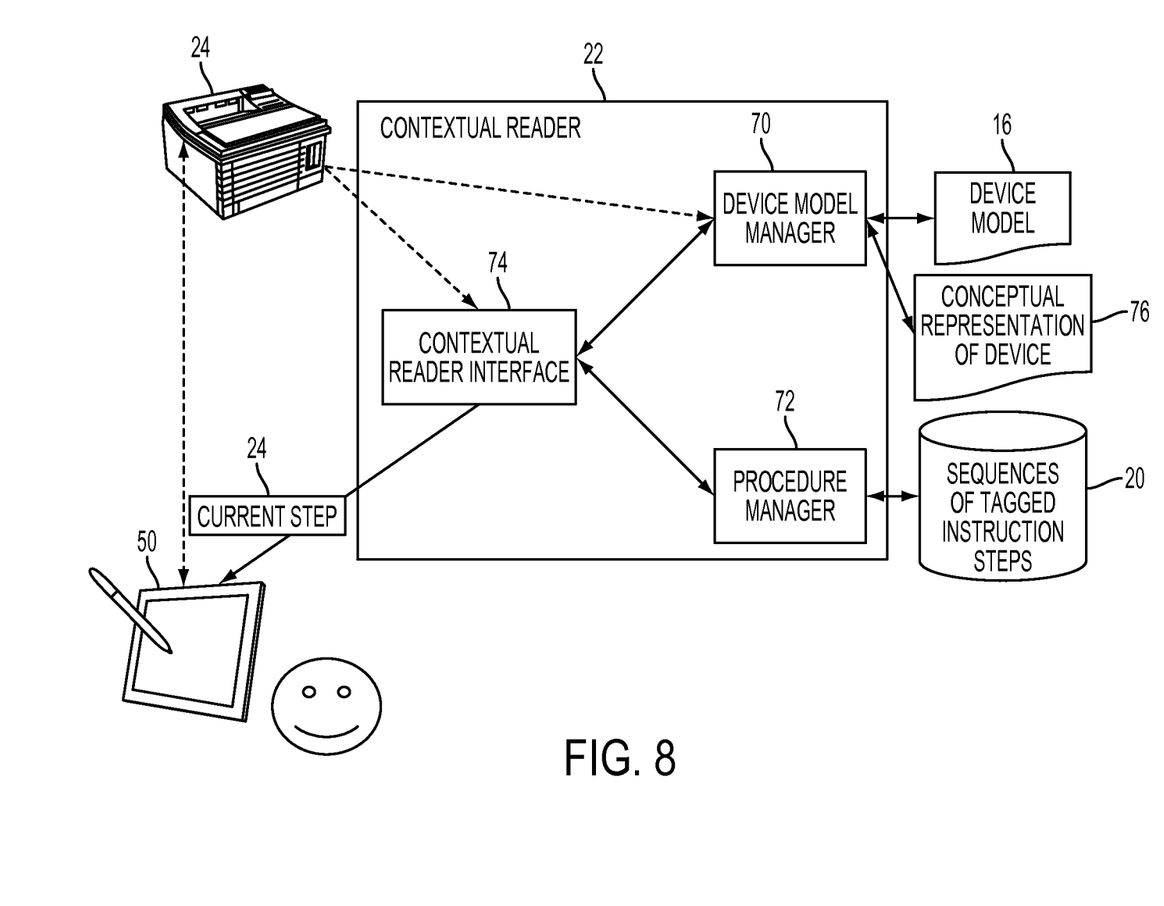
FIG. 8 is a functional block diagram which illustrates operations of the contextual reader of FIG. 1, in accordance with another aspect of the exemplary embodiment.

An overview of the components of the system performing the contextual reading steps of the method is illustrated in FIG. 8. The system uses the processed procedure, information from the device model, and the device data as input. In some embodiments, the contextual reader may be implemented in a mobile computing device which incorporates the display 50 and may use Bluetooth or other wireless communication techniques to communicate with the device 18. In other embodiments, the contextual reader may be stored on a remote server computer.

The contextual reader (CR) 22 includes various software components for integrating the device data 26 and the model 16 with the processed procedures, including a device model manager (DMM) 70, a procedure manager 72, and a contextual reader interface 74.

The DMM 70 is configured for keeping a conceptual representation 76 of the device 18 up-to-date with the actual device state. The conceptual representation 76 may be a part of the device model 16 or stored separately and indicates the current states of each of the components represented in the device model. More particularly, each time an action occurs on a component of the actual device 18 that is included in the device model 16, device data 26 including the new status corresponding to the performance of the action is sent by the device 18 to the DMM 70 and the status of the device model 16 conceptual representation 76 is updated accordingly. In addition, the DMM is capable of making some inferences from the model 16. For example, given the state of a component in the model, it can infer what other steps have to be completed before a given step can be performed. The various types of inferences that may be identified are described below.

The procedure manager 72 handles the access to the procedures as sequences 20 of instruction steps that have been generated in the preprocessing phase.

The contextual reader interface (CRI) 74 is the interface for the end-user with the system. It provides information on the current step to be performed on the device 18 at any time during the session. When the user is initiating the reading of the procedure (S108) or at any time during the session where an event on the device causes a notification 26 to be sent to the system about a change of the device status, the CRI 74 computes and potentially updates the displayed current step.

The computation of the current step (S114) that is to be displayed at S116 is described in the flowchart in FIG. 4. The method begins at S200.

At S202 the CRI 74 updates its current step with the next, not yet accessed step of the processed procedure 20 (or the first step in the procedure 20 initially).

Then, if the current step is marked as optional, the CRI may perform a check to see if this step is required, given the particular context of the device (S204). It may read, within the device properties stored in the conceptual representation 16 of the device, if the conditions defined for these steps are fulfilled. For example, if the operation needs to be performed only if an optional component is installed on the device, the CRI determines whether this component is described as being present among the device properties 60.

If at S204, the current step is optional and required or is not optional, then the CRI 74 checks whether this step has already been performed (S206). In particular, it reads from the device model state charts 62 if the component referenced in the current step is in the state that corresponds to the target state of the operation referenced in the current step. For example, if the instruction step states "open the drawer" and the sensor 46 for the drawer 48 (or updated state chart) indicates the drawer is open, the CRI determines the step has been performed.

In the case of action steps that are not detectable by the device 18, for example, because the device does not have sensors that can detect if the step has been performed, the user may be expected to signal when the step has been performed, e.g., using the user input device 52. For example, a "Next" button is displayed on the display device 50 that the user can press when ready to have the next step displayed. Or, the system may wait a predetermined length of time and assume that the step has been performed. In general, however, at least a plurality, of or all action steps, is/are detectable by sensors 46 on the device.

If at S204, the current step is not required, or at S206 has already been done then the CRI returns to S202 and reiterates S202 where the current step is the next step in the procedure.

If the current step has not been done, based on the sensor data/state charts (and/or user input signals), the CRI determines if the current step is achievable, given the current state of the device 18 (S208). In particular, it reads from the device model state charts 62 and operability dependency constraints 64 if the state chart transition related to this step can be performed.

If at S208, the step is determined to be achievable, then the CRI displays the step to the end-user (S116) and stops until another user operation is performed on the device and the system is notified in the form of new device data (S112).

If at S208, the step is determined not to be achievable, then the CRI determines, from the device model 16, the shortest path to bring the device 18 to a state where this step will be achievable (S210).

If this path corresponds to the previous steps of the processed procedure 20 then the CRI updates its current step to correspond the first step of the identified path (S212).

If the path involves steps which are not described in the previous steps of the processed procedure 20, then the CRI will first add these steps to the procedure (S214) before updating its current step (S212).

If one instruction of the processed procedure 20 is stored as an action simply to be avoided, this instruction is not considered as a step of the procedure. The CRI may instead display it together with the previous instruction into an appended warning section.

The exemplary method uses, as a first step of the preprocessing, the method described by Roulland 2010, in order to extract, from the textual instructions, all the references to components of the device and actions on these components. Roulland 2010 also described how this can be used to link the textual instructions with a virtual representation of the device to have a dynamic illustration of the documentation. In the present system, the textual documentation is linked to the real device 18 and its reading contextualized to the current status of the device. This provides an additional enhancement of the textual documentation which can be used in conjunction with the dynamic illustration of the instruction steps. As an example, FIG. 8 is a screenshot of the display in a prototype of the system, showing a procedure representation, where part of the 3D dynamic visualization 66 of the device 18 is associated with the contextual reading of a processed procedure 20. The system displays both the next step of the procedure to be performed, as shown at 80, and the corresponding visualization part, as shown at 82.

Figure 9:
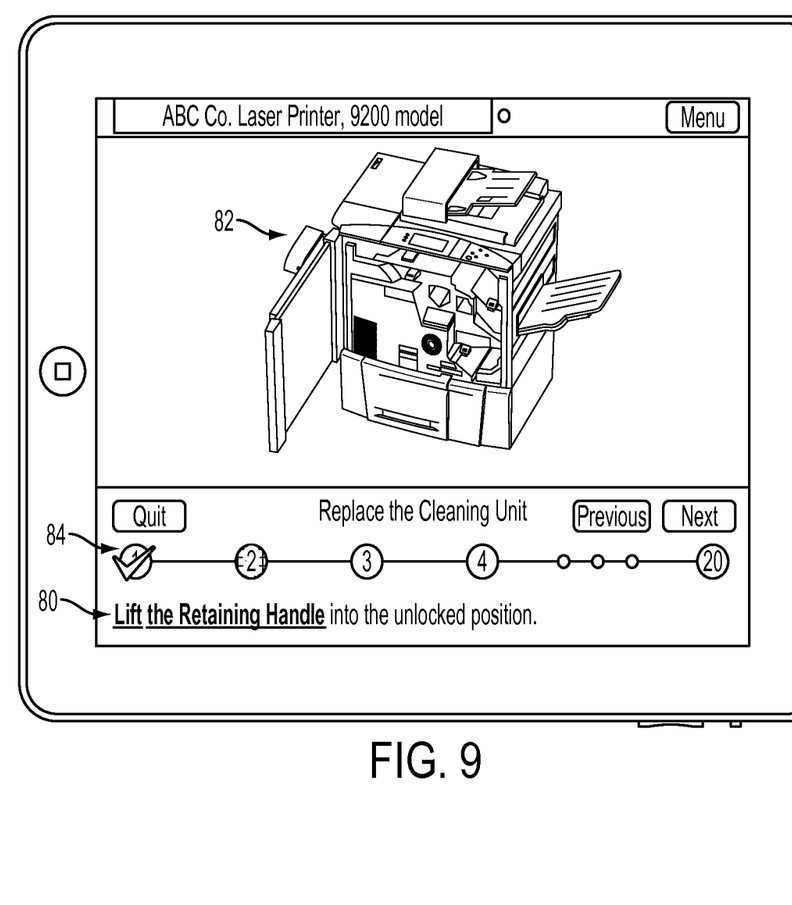
FIG. 9 is a screenshot illustrating the display of a procedure.

The system also visualizes the sequence of steps that have been identified within the processed procedure 20, as shown at 84, highlighting the ones detected as having already been performed (a check mark in FIG. 9) and the current step being monitored by the CR) (a circle in FIG. 9).

While some contextual instructions are embedded in many device user interfaces and software, they are, however, limited to a set of easy, well-known procedures since they are built as part of the device or software at the time of its development. In contrast, the exemplary system is independent of the operated device and is able to generate contextual instruction steps out of any existing technical documentation.

More generally, the system and method disclosed herein can be seen as a feature supporting Interactive Electronic Technical Manuals (IEMT). The present method can connect an IETM with real device data to diagnose a problem given the state of the device and to point the user directly to the correct procedure to solve the problem. The device data is used to provide a contextual reading to the user based on processed textual procedures and a device model that is updated based on the device data.

The method illustrated in FIGS. 3 and/or 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3 and/or 4, can be used to implement the method for contextualizing an operating procedure.

Servicing electromechanical devices, such as printers, is a significant cost to the manufacturer or service contract provider. The exemplary system enables such costs to be reduced by providing customers with a more productive tool to improve troubleshooting when they try to solve a problem they are experiencing with a device. The system can also assist the customer or a technician to perform maintenance operations. As a result, the procedure can be performed more efficiently and accurately by the user.

While the system has been described in terms of a printer, it is to be appreciated that the system and method are applicable to other types of device without being closely integrated with the device and may be provided as a service to customers wishing to implement technical documentation for a device in a more convenient format for the user.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for contextualizing operating procedures, comprising:
  receiving a set of procedures, each procedure including text describing user actions which are to be performed on a physical device to implement the procedure;
  providing a model of the device which refers to a set of components of the physical device on which user actions are performable, for each of the components in the set, the device model providing a state chart which links an action performable on the component with states assumed by the component before and after the action is performed;
  for each procedure in the set, segmenting the text into a sequence of instruction steps, each instruction step including an action to be performed on one of the components of the device that is referred to in the device model, the segmenting of the text including natural language processing the text to identify action verbs and their objects in the text, and where an object of the action verb refers to a component in the device model, tagging the object with the referenced component;
  receiving a request for one of the procedures;
  retrieving the sequence of instruction steps for the requested procedure;
  receiving device data from the physical device;
  for each of a plurality of the instruction steps in the retrieved sequence, contextualizing a current one of the instruction steps, based on the device data and the state chart of the respective component referred to in the device model; and
  outputting a representation of the contextualized instruction step to a display device.

2. The method of claim 1, wherein the contextualizing is performed with a computer processor.

3. The method of claim 1, wherein the model of the device includes at least one operability constraint, each operability constraint constraining a first component to be in a first of its states before a second component is able to change states from a first of its states to a second of its states.

4. The method of claim 1, wherein the segmenting includes applying rules to identify instructions comprising at least one of: conditional steps, iterations, and loops, and wherein the method includes generating a sequence of instructions from the instruction.

5. The method of claim 1, wherein the device data includes a current state of a component of the physical device and the method includes contextualizing the device model with the current state of the component.

6. The method of claim 1, wherein the request for a procedure is received from the physical device.

7. The method of claim 1, wherein the received device data includes device data based on information received from a plurality of sensors on the physical device, each of the plurality of sensors being associated with a respective one of the components.

8. The method of claim 1, wherein the outputting of the representation of the contextualized procedure includes, for each of a plurality of instruction steps in the sequence of instructions, outputting a textual description of a current instruction step to the display device.

9. The method of claim 8, wherein the outputting of the representation of the contextualized procedure includes outputting a visual representation of at least a portion of the physical device corresponding to the current instruction step.

10. The method of claim 1, wherein the physical device referred to in the device model comprises a printer.

11. A method for contextualizing operating procedures, comprising:
  receiving a set of procedures, each procedure including text describing user actions which are to be performed on a physical device to implement the procedure;

providing a model of the device which refers to a set of components of the physical device on which user actions are performable, for each of the components in the set, the device model providing a state chart which links an action performable on the component with states assumed by the component before and after the action is performed, the model of the device including at least one operability constraint, each operability constraint constraining a first component to be in a first of its states before a second component is able to change states from a first of its states to a second of its states;

for each procedure in the set, segmenting the text into a sequence of instruction steps, each instruction step including an action to be performed on one of the components of the device that is referred to in the device model;

receiving a request for one of the procedures;

retrieving the sequence of instruction steps for the requested procedure;

receiving device data from the physical device;

for each of a plurality of the instruction steps in the retrieved sequence, contextualizing a current one of the instruction steps, based on the device data and the state chart of the respective component referred to in the device model, the contextualizing including confirming, based on the device data, that the first component is in the first of its states before providing an instruction for an action to change the second component from the first of its states to the second of its states and, where the first component is not in the first of its states, adding an instruction to the sequence of instructions for performing an action which changes the first component from a second of its states to the first of its states; and outputting a representation of the contextualized instruction step to a display device.

12. The method of claim 11, wherein the segmenting of the text into the sequence of instructions includes natural language processing the text to identify action verbs and their objects in the text, where an object of each action verb refers to a component in the device model, and tagging the object with the referenced component.

13. A method for contextualizing operating procedures comprising:

receiving a set of procedures, each procedure including text describing user actions which are to be performed on a physical device to implement the procedure;

providing a model of the device which refers to a set of components of the physical device on which user actions are performable, for each of the components in the set, the device model providing a state chart which links an action performable on the component with states assumed by the component before and after the action is performed;

for each procedure in the set, segmenting the text into a sequence of instruction steps, each instruction step including an action to be performed on one of the components of the device that is referred to in the device model;

receiving a request for one of the procedures;

retrieving the sequence of instruction steps for the requested procedure;

receiving device data from the physical device;

for each of a plurality of the instruction steps in the retrieved sequence, contextualizing a current one of the instruction steps, based on the device data and the state chart of the respective component referred to in the device model, the contextualizing including:

for each of a plurality of the instruction steps in the sequence of instruction steps:

determining if a current instruction step in the sequence of instruction steps has been performed, based on the state chart of a component or a user input and if it is has been performed, updating the current step with a next step in the procedure;

if it is determined that the current instruction step has not been performed, determining if the current instruction step is achievable, based on any constraints on the component associated with the state chart, and if it is not achievable, inserting at least one missing instruction step into the sequence of instructions and updating the current step with a first of the at least one missing steps; and if it is determined that the current instruction step is achievable, outputting a representation of the current instruction step to the display device and updating the current instruction step with a next instruction step in the sequence of instructions; and outputting a representation of the contextualized instruction step to a display device.

14. The method of claim 13, further comprising, prior to determining if a current instruction step in the sequence of instruction steps has been performed, determining whether a component referred to in the instruction step is described as being present in the device model and if it is not, updating the current instruction step with a next instruction step in the sequence of instructions.

15. A computer program product comprising a non-transitory recording medium storing instructions, which when executed on a computer causes the computer to perform the method of claim 1.

16. A system for contextualizing operating procedures comprising memory which stores instructions for performing the method of claim 1 and a processor in communication with the memory for executing the instructions.

17. A system for contextualizing operating procedures, comprising:

a model of a device stored in memory, the model referring to a set of components of a physical device on which user actions are performable and which, for each of the components in the set, includes a state chart which links an action performable on the component with first and second states assumed by the component before and after the action is performed, wherein for at least some of the components, an operability constraint is stored, each operability constraint constraining the respective component to be in a first of its states before another of the components is able to change states from a first of its states to a second of its states;

a procedure preprocessor configured for receiving a set of procedures, each procedure including text describing user actions which are to be performed on the physical device to implement the procedure and for each procedure, and segmenting the text into a sequence of instruction steps, each instruction step including an action to be performed on one of the components of the physical device that is referred to in the device model; and a contextual reader configured for receiving a request for one of the procedures, receiving device data from the physical device, contextualizing a current instruction step of the sequence of instruction steps for the requested procedure based on the device data and the state chart of the respective component that is referred to in the device model, and outputting a representation of the contextualized instruction step of the procedure to a display device, the contextualizing of the current instruction step including confirming, based on the device data, that the first component is in the first of its states before providing an instruction for an action to change the second component from the first of its states to the second of its states and, where the first component is not in the first of its states, adding an instruction to the sequence of instructions for performing an action which changes the first component from a second of its states to the first of its states.

18. The system of claim 17, further comprising a processor which implements the procedure preprocessor and the contextual reader.

19. A method for contextualizing operating procedures, comprising:

providing a model of a device which refers to a set of components of a physical device on which user actions are performable and which, for each of the components in the set, provides a state chart which links an action performable on the component with states assumed by the component before and after the action is performed;

storing a set of operating procedures for the physical device, each of the operating procedures having been segmented to form a respective sequence of instruction steps, each instruction step including an action to be performed on one of the components of the device that is referred to in the device model;

receiving a request for one of the procedures;

retrieving the stored sequence of instruction steps for the requested procedure;

receiving device data from the physical device;

for each of a plurality of the instruction steps in the sequence of instruction steps, contextualizing a current one of the instruction steps, based on the device data and the state chart of the component referred to in the device model, comprising:

determining if a current instruction step in the sequence of instruction steps has been performed, based on the state chart of a component or a user input, and if it is has been performed, updating the current step with a next step in the procedure;

if it is determined that the current instruction step has not been performed, determining if the current instruction step is achievable, based on any constraints on the component associated with the state chart, and if it is not achievable, inserting at least one missing instruction step into the sequence of instructions and updating the current step with a first of the at least one missing steps; and if it is determined that the current instruction step is achievable, outputting a representation of the current instruction step to the display device and updating the current instruction step with a next instruction step in the sequence of instructions; and outputting a representation of the contextualized instruction step to a display device associated with the physical device.

20. The method of claim 19, wherein the physical device for which the set of operating procedures is stored comprises a printer.

* * * * *